(12) United States Patent
Murakami et al.

(10) Patent No.: US 8,433,179 B2
(45) Date of Patent: Apr. 30, 2013

(54) RECORDING APPARATUS, RECORDING METHOD, AND PROGRAM

(75) Inventors: Naoyuki Murakami, Yokohama (JP); Yasuhiro Shiraishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/323,233

(22) Filed: Dec. 12, 2011

(65) Prior Publication Data

US 2012/0163777 A1 Jun. 28, 2012

(30) Foreign Application Priority Data

Dec. 24, 2010 (JP) ................................. 2010-288681

(51) Int. Cl.
*H04N 5/77* (2006.01)
*H04N 9/80* (2006.01)

(52) U.S. Cl.
USPC .......................................... 386/248; 386/224

(58) Field of Classification Search .................. 386/210, 386/223–224, 248
See application file for complete search history.

(56) References Cited

U.S. PATENT DOCUMENTS 7,403,567 B2 * 7/2008 Kato ......................... 375/240.28
2008/0154982 A1 * 6/2008 Watanabe ...................... 707/203

FOREIGN PATENT DOCUMENTS

JP 2007-088557 11/2007

* cited by examiner

*Primary Examiner* — Thai Tran
*Assistant Examiner* — Nigar Chowdhury
(74) *Attorney, Agent, or Firm* — Cowan, Liebowitz & Latman, P.C.

(57) ABSTRACT

A recording apparatus is arranged such that in the case where moving image data is recorded into recording mediums, seamless discrimination information for discriminating whether or not the moving image data is reproducible successively to preceding moving image data which is to be reproduced precedingly thereto is generated, a code amount of the moving image data which is encoded by an encoding unit is adjusted on the basis of a code amount of the preceding moving image data recorded in one of a first recording medium and a second recording medium in accordance with a simultaneous recording instruction to simultaneously record the moving image data encoded by the encoding unit into the first and second recording mediums, and the moving image data whose code amount is adjusted, and the seamless discrimination information are recorded into the first and second recording mediums.

16 Claims, 12 Drawing Sheets

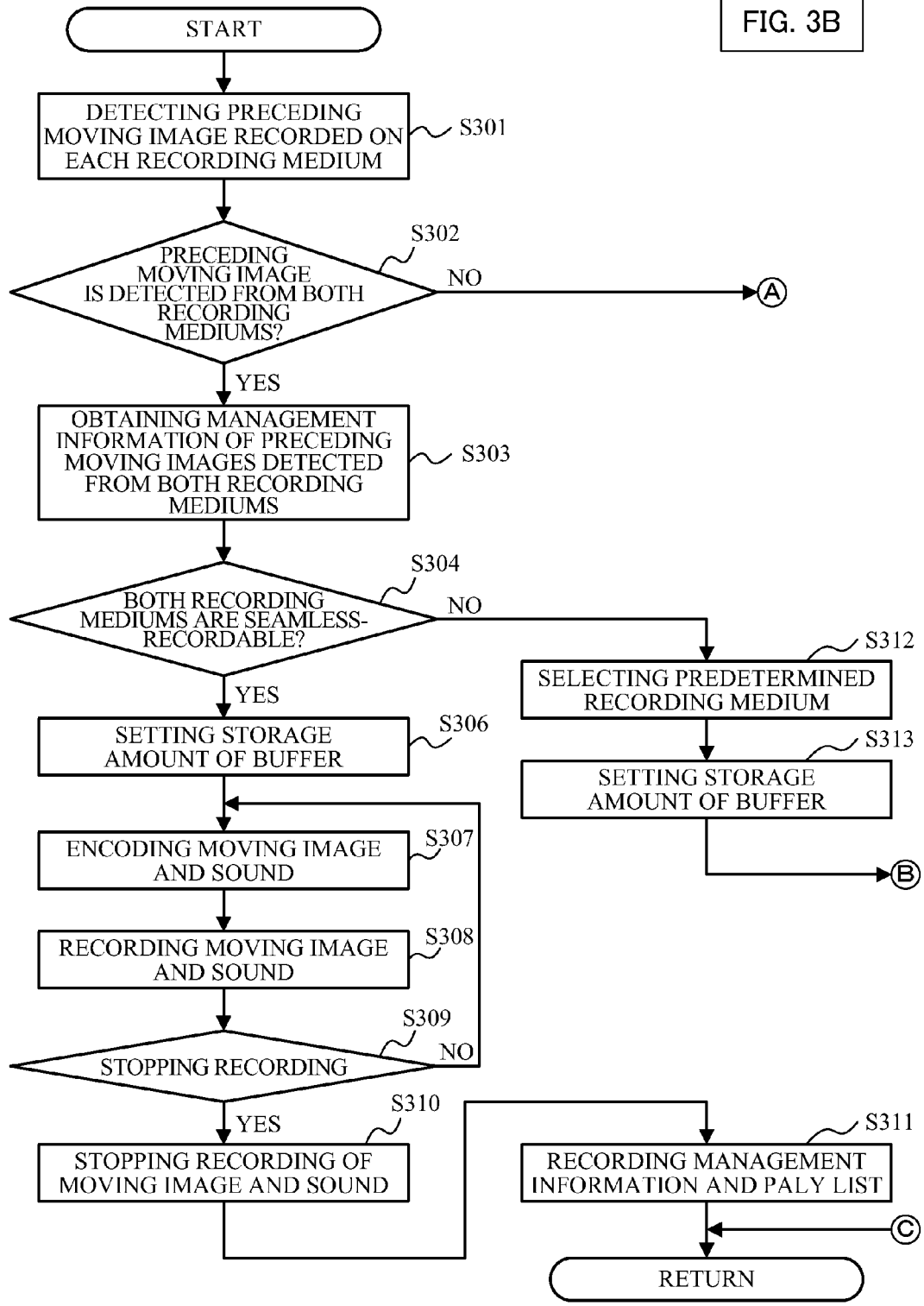

| MOVING IMAGE INFORMATION | SEAMLESS INFORMATION | TIME STAMP AT A TIME OF RECORDING STOP |
| | | STORED DATA AMOUNT OF BUFFER MEMORY AT A TIME OF RECORDING STOP |
| | | SEAMLESS DISCRIMINATION INFORMATION |
| | ATTRIBUTE INFORMATION | NUMBER OF PIXELS |
| | | ASPECT RATIO |
| | | FRAME RATE |
| | | BIT RATE |
| | | SNAP RECORDING INFORMATION |
| | | RECORDING DATE AND TIME INFORMATION |
| | | RECORDING LOCATION INFORMATION |
| CONVERSION TABLE | 0 | PTS0 | ADDRESS 0 |
| | 1 | PTS1 | ADDRESS 1 |
| | ⋮ | | |
| | n | PTSn | ADDRESS n |

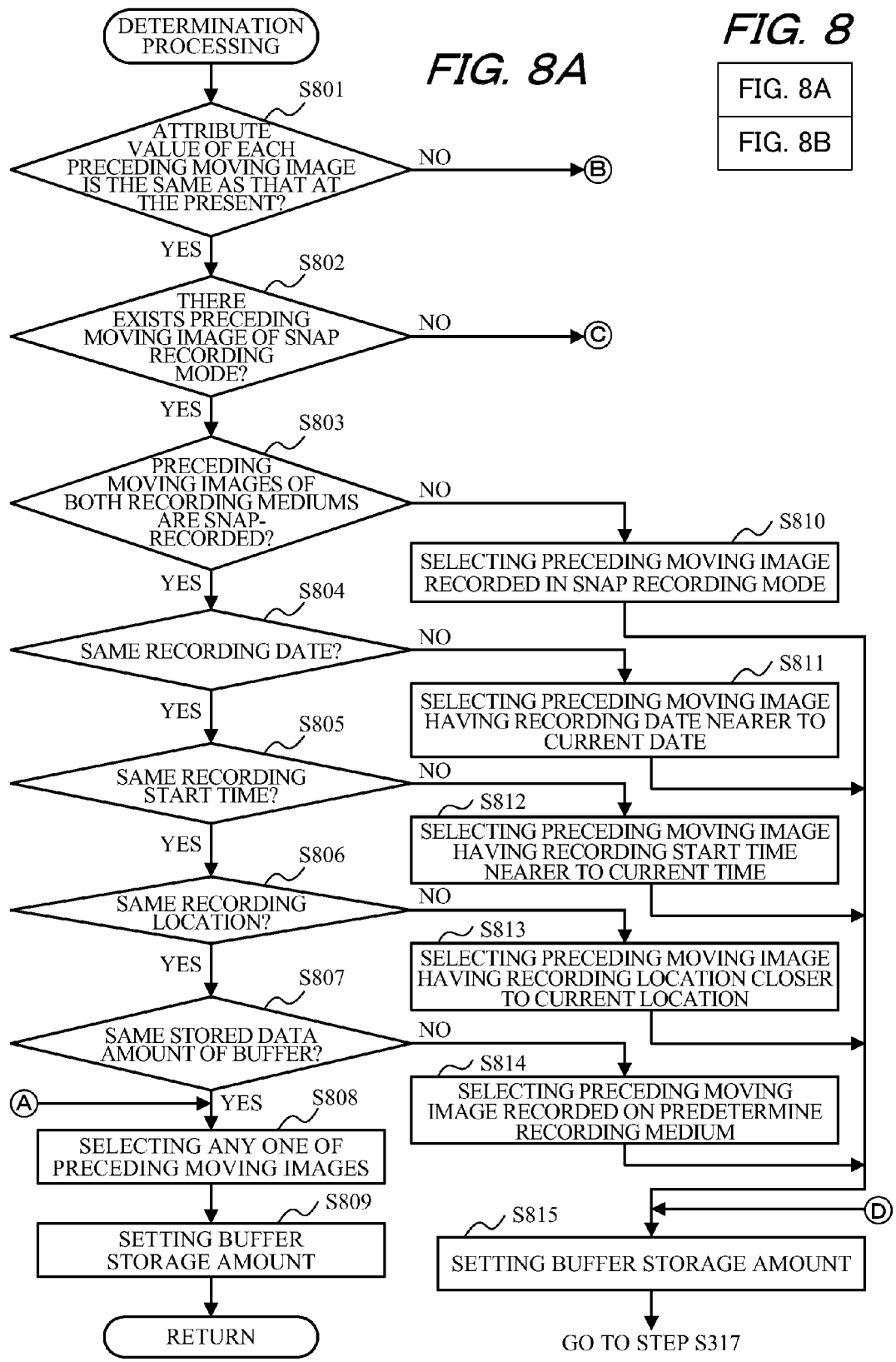

RECORDING APPARATUS, RECORDING METHOD, AND PROGRAM

BACKGROUND OF THE INVENTION

1. Field of the Invention

The present invention relates to a recording apparatus and, more particularly, to a recording apparatus for recording image data into a recording medium.

2. Description of the Related Art

In the related art, a recording apparatus for recording a moving image signal and an audio signal into a recording medium has been known. In such a kind of recording apparatus, an apparatus which can record a moving image signal to a plurality of recording mediums also exists. For example, as a home-use DVD recorder, a hard disk recorder having a built-in hard disk (HDD) having a large capacity and a DVD drive is disclosed in the Official Gazette of Japanese Patent Application Laid-Open No. 2007-288557. The hard disk recorder disclosed in the above Japanese Patent Application Laid-Open No. 2007-288557 has such a function of copying a moving image signal and an audio signal such as a television program or the like which has once been recorded into the HDD, to a DVD loaded into the DVD drive.

A video camera having a function for simultaneously recording the same moving image signal to a plurality of recording mediums has also been put into practical use. By recording the same moving image signal to a plurality of recording mediums as mentioned above, if the moving image signal recorded in one of the plurality of recording mediums is not correctly reproduced or even in the case where one of the plurality of recording mediums was lost, the same moving image can be reproduced from another recording medium.

A technique for controlling a code amount at the time of recording start so that moving images of different recorded scenes can be successively reproduced in a video camera or the like has also been proposed.

However, in the related art, there is such a problem that in the case of simultaneously recording the same moving image to a plurality of recording mediums, such a construction that the moving image is recorded to each recording medium so that the recorded moving image is reproducible successively to a scene recorded just precedingly thereto cannot be realized.

In consideration of the foregoing problems, an aspect of the present invention is to provide a recording apparatus in which when a same moving image is simultaneously recorded to a plurality of recording mediums, a moving image can be recorded to each recording medium so that the recorded moving image is reproducible successively to a scene recorded just precedingly thereto (seamless recording).

Another aspect of the present invention is to provide a recording apparatus in which when a moving image is recorded to a plurality of recording mediums, the user is enabled to judge without a burden whether or not a moving image can be recorded to each recording medium so that the recorded moving image is reproducible successively to a scene recorded just precedingly thereto.

SUMMARY OF THE INVENTION

To accomplish the objects of the invention, a recording apparatus according to the invention is constructed in such a manner that in the case where moving image data is recorded to recording mediums, seamless discrimination information for discriminating whether or not the moving image data is reproducible successively to preceding moving image data which is to be reproduced precedingly thereto is generated, a code amount of the moving image data which is encoded by the encoding unit is adjusted on the basis of a code amount of the preceding moving image data recorded into one of first and second recording mediums in accordance with a simultaneous recording instruction to simultaneously record the moving image data encoded by an encoding unit into the first recording medium and the second recording medium, and the moving image data whose code amount is adjusted, and the seamless discrimination information are recorded into the first and second recording mediums.

Further features of the present invention will become apparent from the following description of exemplary embodiments with reference to the attached drawings.

BRIEF DESCRIPTION OF THE DRAWINGS

FIG. 6 is a diagram illustrating management information included in the recording information in the embodiment of the invention.

DESCRIPTION OF THE EMBODIMENTS

Exemplary embodiments of the present invention are described in detail hereinbelow with reference to the accompanied drawings.

First Embodiment

Figure 1:
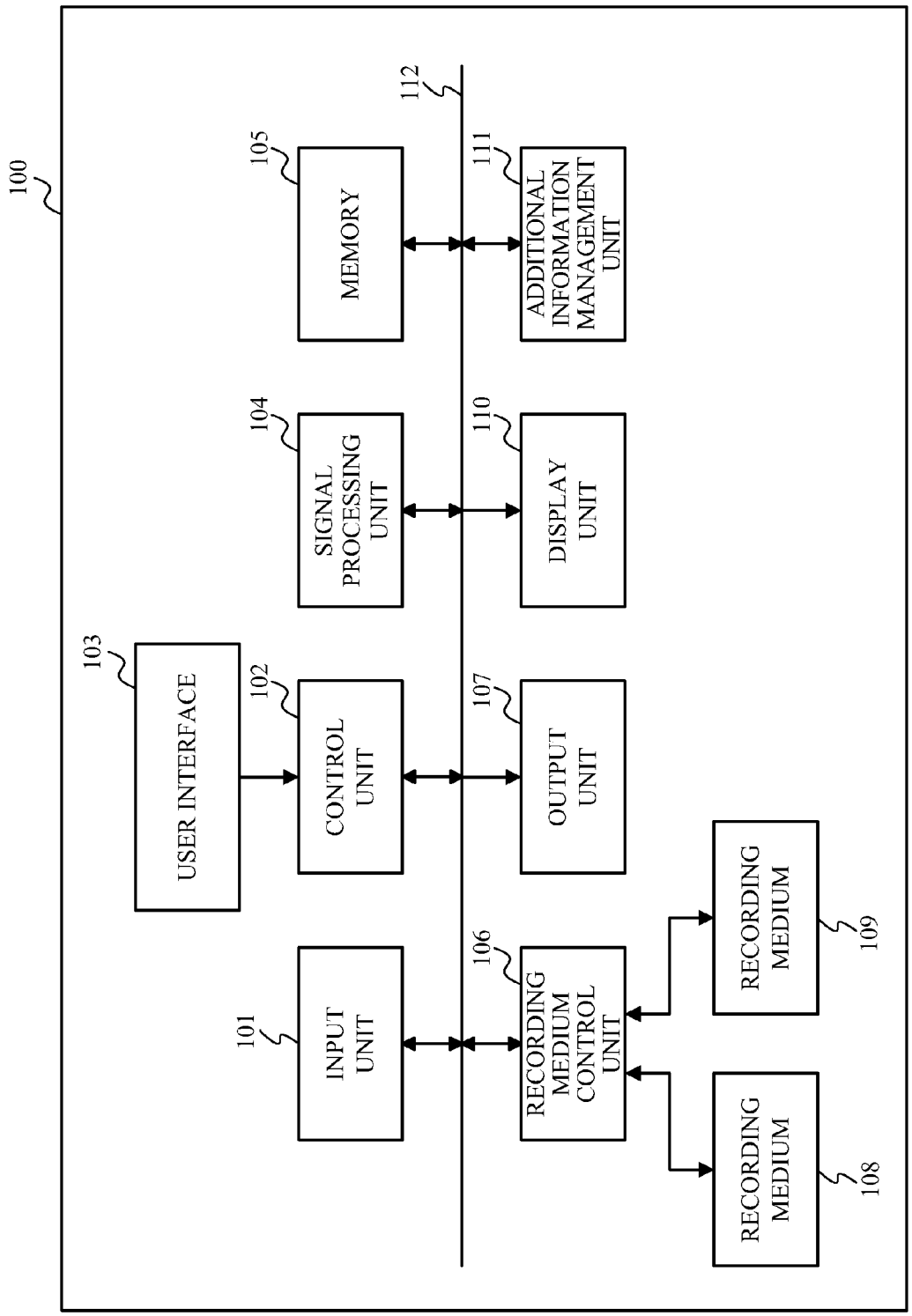
FIG. 1 is a block diagram illustrating a constructional example of a recording apparatus according to an embodiment of the invention.

FIG. 1 is a block diagram illustrating a constructional example of a recording apparatus 100 according to the embodiment.

In FIG. 1, an input unit 101 obtains moving image data and audio data and outputs them. In the embodiment, the input unit 101 receives the moving image data and audio data supplied from an outside of the recording apparatus 100. However, it is also possible to use a construction in which the input unit 101 includes an image pickup unit and a microphone to obtain a photographed moving image and obtain audio data via the microphone.

A control unit 102 controls the whole operation of the recording apparatus 100 in accordance with an input from a user interface (UI) 103. The control unit 102 includes a microcomputer, a memory, and the like and controls the recording apparatus 100 in accordance with a program stored in the memory (not shown). The control unit 102 also includes therein a recording medium interface for communicating data and commands to/from a recording medium control unit 106.

The UI 103 includes various kinds of switches which can be operated by the user. The UI 103 receives various kinds of instructions and the like made by the user and sends them to the control unit 102. The UI 103 also includes a power switch, a switch for instructing start/stop of the recording, a switch for changing over a mode of the recording apparatus 100, and the like.

Upon recording, a signal processing unit 104 encodes the moving image data and audio data input by the input unit 101 in accordance with a well-known encoding method such as MPEG or the like and compresses their information amounts. The signal processing unit 104 also executes processings necessary to record the moving image data and audio data. Upon reproduction, the signal processing unit 104 decodes the reproduced moving image data and audio data and expands their information amounts. Upon recording, the signal processing unit 104 outputs information of code amounts (data amounts) of the encoded moving image data and audio data to the control unit 102. On the basis of the data amount (code amount) of the encoded moving image data from the signal processing unit 104, the control unit 102 controls an encoding processing of the signal processing unit 104, which will be described hereinafter, and adjusts the code amount of the moving image data.

A memory 105 stores the moving image data and audio data. By accessing the memory 105, each block of the recording apparatus 100 processes the moving image data and audio data. Besides the moving image data and audio data, the memory 105 stores various kinds of information such as information of a file system, management information, additional information, which will be described hereinafter, and the like and, further, plays a role of a work memory or the like for control by the control unit 102. The memory 105 also plays a role of a buffer memory upon recording or reproduction of the data.

The recording medium control unit 106 records and reproduces the moving image data and audio data or various kinds of information to/from recording mediums 108 and 109 (a first recording medium and a second recording medium). Upon recording, the recording medium control unit 106 records the moving image data and audio data stored in the memory 105 into the recording mediums 108 and 109. Upon reproduction, the recording medium control unit 106 reproduces the moving image data and audio data from the recording mediums 108 and 109 and stores into the memory 105. In the present embodiment, the recording mediums 108 and 109 are constructed as independent different recording mediums and are random-accessible recording mediums such as hard disks (HDDs), flash memory cards, or the like.

The recording medium control unit 106 manages the moving image data and audio data or various kinds of information which are recorded in the recording mediums 108 and 109 as a file in accordance with a file system such as an FAT (File Allocation Table) or the like. The recording medium control unit 106 has a well-known interface (I/F) such as an ATA (AT Attachment) or the like and communicates data and various kinds of commands to/from a recording medium I/F in the control unit 102. The apparatus 100 is constructed so that the recording mediums 108 and 109 can be easily loaded and ejected into/from the recording apparatus 100 by a loading and ejecting mechanism (not shown). However, the apparatus 100 may be constructed in such a manner that both or one of the recording mediums 108 and 109 are/is built in the recording apparatus 100.

In the case where moving image files are written into or read out from the recording mediums 108 and 109, the control unit 102 controls the recording medium control unit 106 so that file system data (management data) is reproduced from the recording mediums 108 and 109 and stored into the memory 105. The file system data is data showing a file name and a file size of the data recorded in the recording mediums 108 and 109, a recording address of the data, and the like and is management information to manage the files. The control unit 102 controls the writing and read-out of the files in accordance with the read-out file system data. The control unit 102 updates the file system data stored in the memory 105 in accordance with the writing of the files into the recording mediums 108 and 109. The control unit 102 records the updated file system data into the recording mediums 108 and 109 by the recording medium control unit 106.

In the embodiment, a UUID (Universal Unique Identifier) is added to each of the moving image files which are recorded into the recording mediums 108 and 109 and resultant moving image files are recorded. The UUID is discrimination information to uniquely discriminate each moving image file. Each time a moving image file is newly generated, the control unit 102 generates a UUID of a different value. Therefore, by confirming the values of the UUIDs recorded in the recording mediums 108 and 109, each moving image file can be easily discriminated.

By operating the UI 103, the user can instruct the switching of the operating mode of the recording apparatus 100, the start/stop of the recording of the moving image data, or the like. By operating the UI 103, the user can select the number of pixels, a frame rate, a data rate (bit rate), and the like of the moving image which is recorded from predetermined values. In the embodiment, if the two recording mediums 108 and 109 are loaded, the user arbitrarily selects one of the recording mediums by operating the UI 103 and records the moving image data to the selected recording medium. Further, in the embodiment, if the two recording mediums 108 and 109 are loaded, the user can also instruct so as to simultaneously record the moving image data to those two selected recording mediums 108 and 109.

An output unit 107 outputs the reproduced moving image data and audio data to an external display apparatus or the like of the recording apparatus 100. A display unit 110 displays the moving image and various kinds of information to a display apparatus such as a liquid crystal panel or the like. In accordance with the recording of the moving image file to the recording mediums 108 and 109, an additional information management unit 111 generates management information regarding the moving image data and additional information including a play list, stores into the memory 105, or updates the additional information stored in the memory 105. The additional information management unit 111 detects the additional information read out of the recording mediums 108 and 109 by the recording medium control unit 106 and stores into the memory 105. In response to an instruction from the control unit 102, the recording medium control unit 106 reads out the additional information from the memory 105 and records into each of the recording mediums 108 and 109. A data bus 112 is used to transmit and receive data and various kinds of commands to/from the units of the recording apparatus 100.

Figure 5:
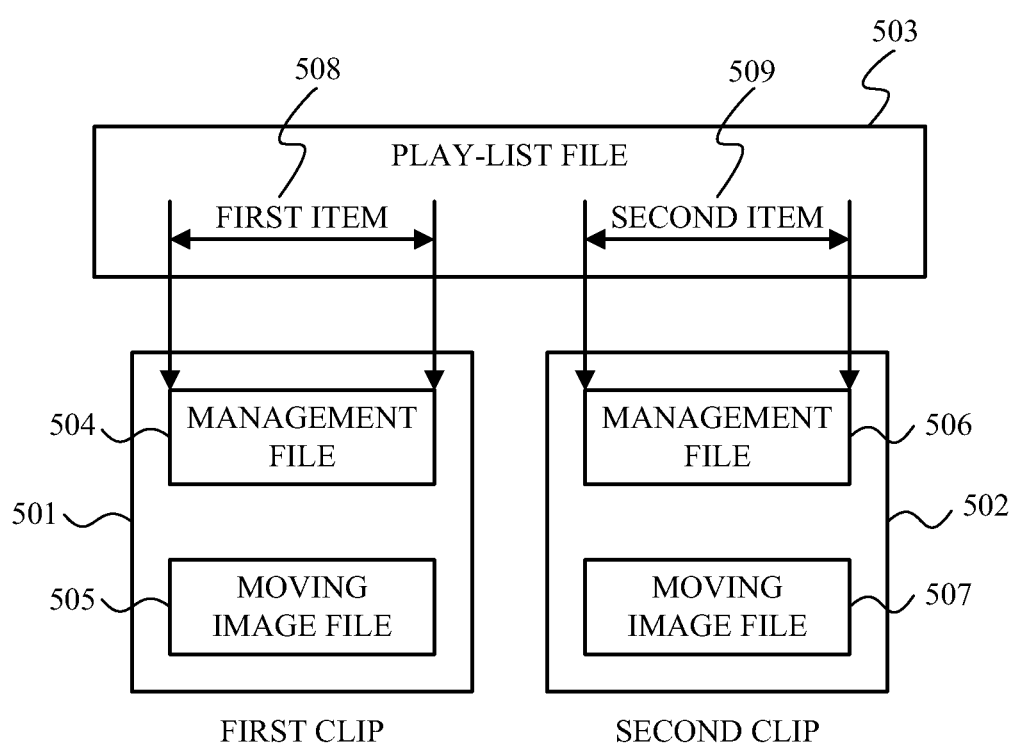
FIG. 5 is a diagram illustrating a format of recording information in the embodiment of the invention.

Subsequently, a recording format of the moving image file by the video camera 100 will be described. FIG. 5 is a diagram illustrating a relation between the moving image file and management file recorded in each of the recording mediums 108 and 109 and a play-list file.

In the embodiment, one clip is recorded by one photographing. One clip is constructed by two kinds of data of the moving image file and the management information regarding the moving image file. The moving image file and the management information are managed as independent files.

The same clip number is added to the moving image file and the management information file of the same clip, so that a correspondence between them can be recognized.

In accordance with the recording of one clip, a play-list file showing reproduction order of clips is generated. The play-list file includes a plurality of items and the reproduction order of each clip is designated by the item. Each time one clip is recorded, one item is generated. A clip number of the corresponding clip is included in each item. By designating each clip in order of items and reproducing it, a plurality of clips can be reproduced in recording order.

FIG. 5 illustrates a relation between two clips and the play list in the case where the two clips are recorded. As illustrated in FIG. 5, a first clip 501 is constructed by a moving image file 505 and a management file 504 and a second clip 502 is constructed by a moving image file 507 and a management file 506.

The play-list file defines reproduction order of all clips recorded in the recording mediums. In the example illustrated in FIG. 5, two items are included in a play-list file 503. A first item 508 is associated with the first clip 501 and a second item 509 is associated with the second clip 502. Therefore, by reproducing the first item and the second item in this order, the clips are reproduced in order of the first clip and the second clip.

A time stamp indicating reproduction start time and reproduction end time is added to each item together with the clip number. A reproduction start position and a reproduction end position of each clip are defined by the time stamp.

FIG. 6 is a diagram illustrating management information 601 included in the management files 504 and 506. As illustrated in FIG. 6, moving image data information which is additional information of the moving image data, and a conversion table are included in the management information 601.

Seamless information associated with seamless recording and seamless reproduction, which will be described hereinafter, and attribute information of the moving image data are included in the moving image data information. The seamless information includes a time stamp at the time of recording stop of a moving image, which will be described hereinafter, a stored data amount of a buffer memory at the time of recording stop, and seamless discrimination information for discriminating whether or not the seamless reproduction can be performed. The attribute information includes attributes of the moving image such as the number of pixels of one frame of the moving image, aspect ratio, frame rate, and bit rate (data rate). The attribute information also includes snap recording information for discriminating whether or not the data is recorded in a snap recording mode, recording date information, and recording location (place) information.

A number of each GOP included in the moving image, a time stamp (PTS) of the top I-picture of the GOP, and an address on the recording medium are included in the conversion table. By using the conversion table, an address of the moving image data corresponding to a reproduction time (PTS) indicated by the item in the play-list file can be known.

The management information 601 is generated by the additional information management unit 111 and recorded into the recording mediums 108 and 109.

Subsequently, the seamless recording of a moving image in the present embodiment will be described. In the present embodiment, when a moving image file is recorded into the recording mediums 108 and 109, a code amount of the moving image at the time of recording start is adjusted so that the moving image file can be reproduced successively to the moving image file recorded just precedingly to the moving image file which will be recorded from now on. Such a recording is called seamless recording. When the moving image is encoded by the signal processing unit 104, the code amount is controlled in accordance with a model for code amount control prescribed based on a recording format.

Figure 2A:
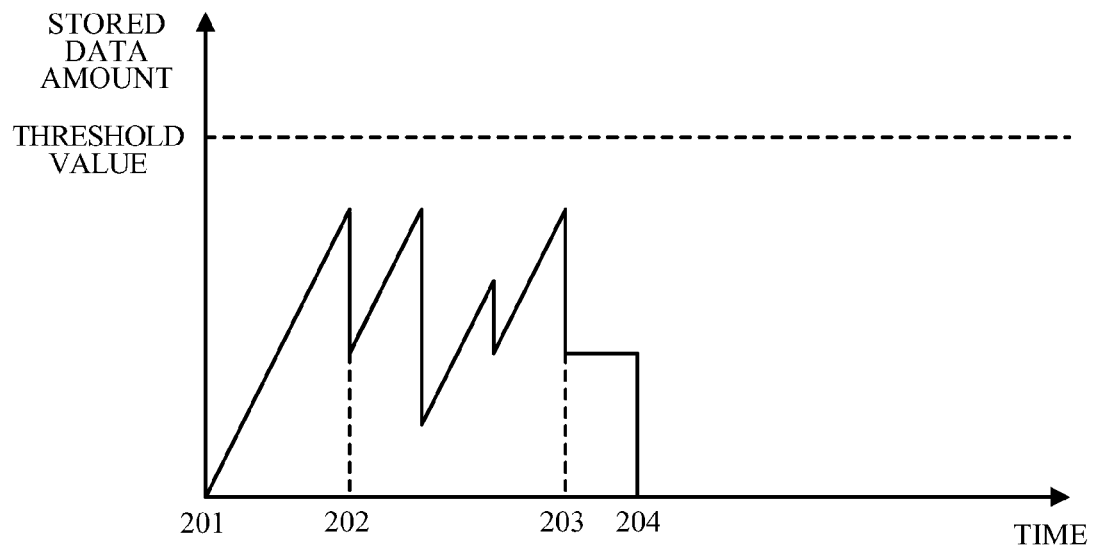
FIGS. 2A, 2B and 2C are diagrams each illustrating a temporal change of a stored data amount of a buffer included in the construction of the recording apparatus according to the embodiment of the invention.
Figure 2B:
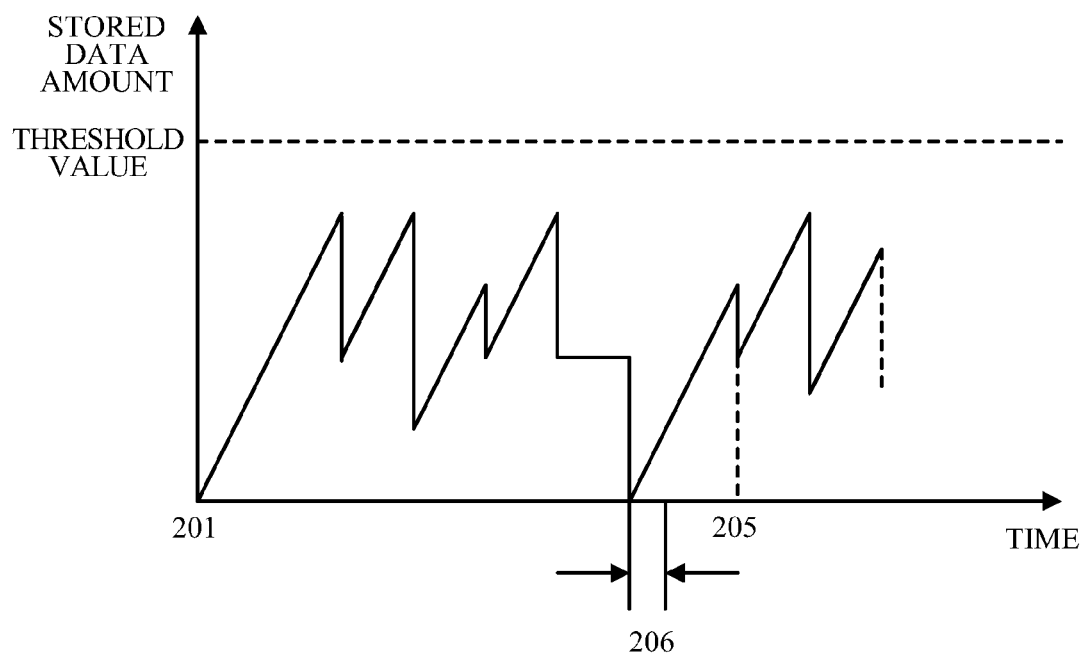
Figure 2C:
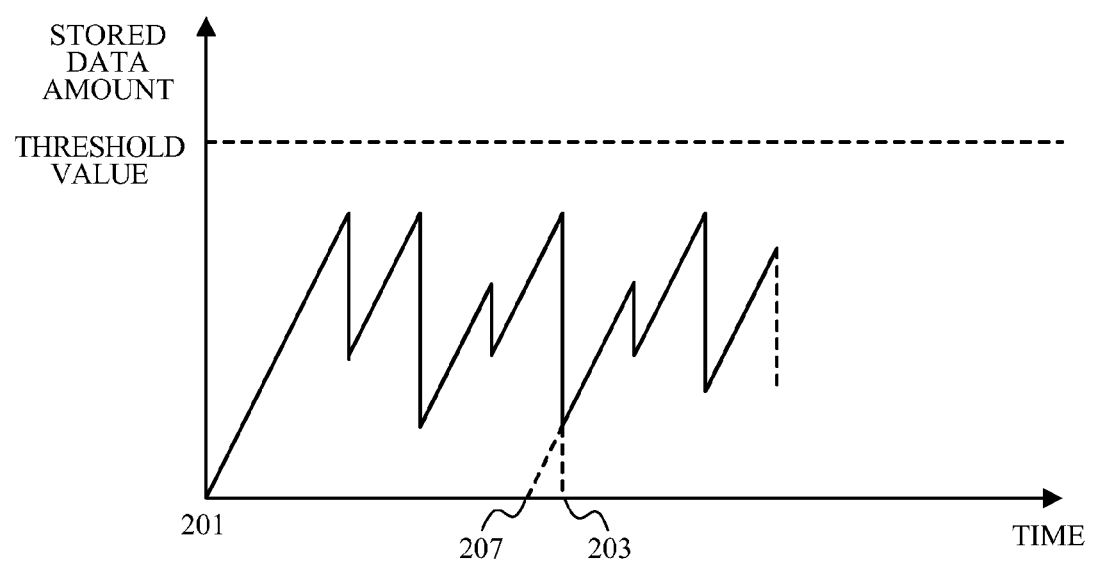

FIGS. 2A to 2C are graphs each showing a successive change of stored data amount in the buffer memory upon decoding (upon reproduction) of the encoded moving image, in accordance with the model prescribed based on the recording format of the recording apparatus 100. Since a rate of the moving image data recorded in the recording medium and a rate of the encoded data differ, the reproduced data is temporarily stored into the buffer memory and, thereafter, decoded. Therefore, at the time of encoding, a stored data amount of the buffer memory upon reproduction is presumed and the code amount of the moving image data is adjusted in accordance with the predetermined buffer model.

In FIGS. 2A to 2C, an axis of abscissa indicates a time and an axis of ordinate indicates a stored data amount of the buffer memory. At the time of encoding, the code amount is controlled so as not to exceed the maximum data storage amount (threshold value) prescribed based on the buffer model. The code amount is controlled so that the stored data amount of the buffer memory does not reach 0 on the way of the recording. By controlling in this manner, the data of an amount within a predetermined range is always stored in the buffer memory upon reproduction. Therefore, the moving image data can be successively reproduced without an interruption.

FIG. 2A illustrates a successive change of stored data amount in the buffer memory in the case of reproducing one moving image from the recording mediums 108 and 109. In FIG. 2A, the successive change of the stored data amount at the time when the moving image data, recording of which is started at time 201 and is finished at time 204 is reproduced is illustrated.

When the reproduction is started at time 201, the supply of the encoded moving image data is started and the data is stored into the buffer memory. When decoding time of a designated top frame of the moving image data comes at time 202 and the data of one frame is decoded, the decoded data is read out from the buffer memory, so that a storage amount decreases. The encoded data is always stored into the buffer memory at constant rate. After the top frame was decoded, the data of each frame is decoded at timing according to a frame rate (the number of frames per unit time). Each time the data is decoded, the data of the decoded frame is read out from the buffer and the storage amount therein decreases. In this manner, the data is stored into the buffer memory. When the supply of the data of the last frame is finished at time 203, the stored data amount of the buffer memory does not increase any more. When the decoding of the last frame is finished at time 204, all of the data in the buffer memory is read out and the stored data amount reaches 0.

FIG. 2B illustrates a successive change of stored data amount in the buffer memory in the case of reproducing moving images of two scenes from the recording mediums in which moving image data is recorded in such a manner that after the one moving image data is recorded in FIG. 2A, moving image data of another scene is recorded successively thereto. A successive change of stored data amount until time 204 is the same as that in FIG. 2A. After the decoding of the last frame of the moving image data of a preceding scene (preceding moving image data) is finished at time 204, when the storage of moving image data of the next scene is started, the stored data amount increases. When the first frame of the moving image data of the second scene is decoded at time 205, the storage amount decreases by the amount corresponding thereto. After that, the stored data amount increases or decreases in a manner similar to the moving image data of the preceding scene. The decoding time 204 of the last frame of the moving image data of the preceding scene and the decoding time 205 of the first frame of the moving image data of the next scene are compared. Since it takes a time to store the data of the first frame of the moving image data of the next scene, an output of the top frame of the next scene is delayed by a time 206 to a frame interval corresponding to the frame rate. Therefore, when viewing the reproduced moving image, updating timing of a display screen at a boundary between the preceding scene and the subsequent scene is delayed, so that a reproduced image appears as if it is a momentary stop motion image.

In order to prevent such a situation that the reproduced image stops as mentioned above, it is sufficient to start the supply of the moving image data of the next scene from time 203 in FIG. 2A. However, in such a case, since the moving image data of the next scene is stored in addition to the storage data amount at time 203, such a situation that the stored data amount of the buffer memory exceeds a threshold value during the reproduction of the next scene is considered. In this case, the supply of the data to the buffer memory is temporarily stopped, the data of the frame stored precedingly is decoded, and after a storage space is formed in the buffer memory, the supply of the data is restarted. Thus, also in this case, there is a possibility that the reproduced image appears as if it is a momentary stop motion image.

Therefore, in order to successively reproduce the moving image data without stopping the reproduced image in the boundary portion between the two scenes, it is necessary to control the code amount of the subsequent scene so that the stored data amount does not exceed the threshold value even in the case where the storage of the moving image data of the next scene is started from time 203.

FIG. 2C illustrates a successive change of stored data amount in the buffer memory at the time of reproducing moving image data of two scenes in the case where the moving image of the subsequent scene is encoded so as to be seamlessly reproducible.

In the case of FIG. 2C, a code amount of a top frame of the next scene is adjusted based on the stored data amount in the buffer memory at the time of recording stop of the preceding scene, a data rate of the recording data, and decoding timing of the next scene.

A successive change of stored data amount in the buffer memory for an interval from time 201 to time 203 is the same as that in FIG. 2A. The code amount of the moving image data of the next scene is adjusted based on the stored data amount in the buffer memory at time 203. Therefore, even if the supply of the top frame of the next scene is started, for example, at time 207 for the same interval as the frame interval during which the last frame of the next scene is supplied, the stored data amount in the buffer memory does not exceed the threshold value.

As mentioned above, by adjusting the code amount of the moving image data which is recorded from now on, based on the stored data amount in the buffer memory at a point of time of completion of the data supply of the last frame of the preceding moving image data, the seamless reproduction can be performed. The operation in which the data is recorded in this manner is called seamless recording.

In the present embodiment, the seamless recording is executed in accordance with the order of the moving image data recorded into the recording mediums 108 and 109. Information of the order of the moving image data recorded in the recording mediums 108 and 109 is stored into the additional information to be recorded. When a new scene is recorded, the code amount is adjusted so that the moving image data recorded just precedingly thereto and moving image data which is recorded from now on can be seamlessly reproduced.

Subsequently, the operation in a normal recording mode in the embodiment will be described. In the present embodiment, the seamless recording is automatically executed unless otherwise the user instructs inhibition of the seamless recording by the UI 103. First, when an instruction to shift to the recording mode of the moving image data is received from the UI 103, the recording apparatus 100 is shifted to a recording stand-by state and waits for a recording start instruction. In the recording stand-by state, the moving image regarding the moving image data input from the input unit 101 is displayed on the display unit 110.

In the recording stand-by state, the control unit 102 instructs the recording medium control unit 106 so as to read out the play-list file from the selected recording medium and store into the memory 105. The additional information management unit 111 detects the recording order of the moving image files recorded in the selected recording medium from the play list stored in the memory 105. The additional information management unit 111 detects the moving image file which was finally recorded (preceding moving image) and notifies the control unit 102 of a clip number of the preceding moving image. The control unit 102 instructs the recording medium control unit 106 so as to read out the management file of the preceding moving image detected by the additional information management unit 111. The recording medium control unit 106 reads out the management file of the designated clip and stores into the memory 105.

In the recording stand-by state, when the recording start instruction is input from the UI 103, the signal processing unit 104 reads out the moving image data and audio data which are input by the input unit 101 and stored in the memory 105 and starts the encoding. The encoded data is stored into the memory 105 by the signal processing unit 104. At this time, the control unit 102 discriminates whether or not an inhibition of the seamless recording is instructed. If the inhibition of the seamless recording is not instructed, that is, in the case of executing the seamless recording, the generation code amount of the moving image data is adjusted as mentioned above based on the information of the code amount of the preceding moving image in the management information stored in the memory 105. A well-known technique can be used in the adjustment processing of the code amount. For example, in the case of performing the MPEG encoding, the generation code amount is adjusted by changing a quantization step. If the inhibition of the seamless recording is instructed, the control unit 102 controls the generation code amount in accordance with the buffer model prescribed based on the recording format irrespective of the information of the code amount of the preceding moving image.

When the recording start instruction is input, the control unit 102 detects a recording start date based on an output of a timer (not shown) and sends to the additional information management unit 111. When the recording start instruction is input, the control unit 102 detects a location (place) at the time of recording start based on an output of a location information detection unit (not shown) and sends to the additional information management unit 111. The control unit 102 also detects information regarding the number of pixels of the moving image which is currently being recorded, the aspect ratio, the frame rate, and the bit rate and sends to the additional information management unit 111. The additional information management unit 111 generates management information including those information and stores in the memory 105. The control unit 102 instructs the signal processing unit 104 to send a GOP number and a time elapsed from the top of the GOP to the additional information management unit 111 each time the encoding processing of the moving image of 1 GOP is completed. The recording medium control unit 106 sends information of a recording address of each GOP to the additional information management unit 111. Based on those information, the additional information management unit 111 generates a conversion table and stores in the memory 105.

In the present embodiment, the data rate of the moving image data and audio data which are encoded by the signal processing unit 104 is lower than the data rate at which the data can be recorded into the recording mediums 108 and 109. Therefore, in the present embodiment, the encoded data is temporarily stored into the memory 105. Each time a data amount of the encoded data stored in the memory 105 reaches a first predetermined amount, the recording medium control unit 106 reads out the encoded data from the memory 105 and records into the recording mediums 108 and 109. At a point of time when an amount of encoded data stored in the memory 105 decreases to a second predetermined amount smaller than the first predetermined amount, the read-out of the encoded data from the memory 105 is temporarily stopped and the recording processing to the recording mediums 108 and 109 is interrupted. The processing is repeated in this manner.

The control unit 102 combines a serial number of the recording apparatus 100, a recording date, prepared random numbers, and the like, generates a UUID having a numerical value of a predetermined bit length by a well-known method, adds to the moving image file, and records a resultant moving image file. When the recording start instruction is input, each time a moving image file is newly generated, the control unit 102 generates a UUID of a different value. In the case of simultaneously recording the same data to the two recording mediums 108 and 109, the UUID having the same value is added to each moving image file.

When a recording stop instruction is received from the UI 103 during the recording of a moving image, the control unit 102 stops the encoding of the moving image data and audio data, which is executed by the signal processing unit 104, and closes the file which is currently being recorded by the recording medium control unit 106. The control unit 102 instructs the additional information management unit 111 to add an item corresponding to a clip of the moving image recorded at present to the play list and to change reproduction order. The control unit 102 obtains the information of the code amount of the buffer memory at the time of recording stop and sends to the additional information management unit 111. The additional information management unit 111 stores the information of the code amount at the time of recording stop in the moving image data recorded at present and the information of the time stamp at the time of recording stop into the management information. The additional information management unit 111 generates snap recording information showing that the recording is not the snap recording (which will be described hereinafter) and stores into the management information. Further, the additional information management unit 111 generates seamless discrimination information for discriminating whether or not the seamless reproduction of the moving image file recorded at present is possible and stores into the management information.

If the inhibition of the seamless recording is not instructed, the seamless discrimination information indicating that the seamless reproduction is possible is formed. If the inhibition of the seamless recording is instructed, the seamless discrimination information indicating that the seamless reproduction is impossible is generated. The recording medium control unit 106 records the management information generated by the additional information management unit 111 as mentioned above and the play-list file, into the recording mediums 108 and 109.

In this manner, the moving image data is recorded to the selected one of the two recording mediums 108 and 109.

Subsequently, processings in a snap recording mode will be described. In a normal recording mode, the recording of the moving image is started in accordance with the recording start instruction by the user and the recording of the moving image is stopped in accordance with the recording stop instruction. On the other hand, in the snap recording mode, the recording of the moving image is started in accordance with the recording start instruction by the user and, thereafter, when the moving image is recorded for a predetermined period, the recording is automatically stopped. In the present embodiment, in the snap recording mode, it is assumed that the recording is automatically stopped when 4 seconds elapses after the recording start.

In the recording stand-by state, the user can set the snap recording mode by operating the UI 103. When the recording start instruction is input in a state where the snap recording mode is set, the control unit 102 starts the encoding of the moving image and sound by the signal processing unit 104 as mentioned above and starts the recording of the moving image and sound to the designated recording medium by the recording medium control unit 106. Also in the snap recording mode, if the inhibition of the seamless recording is not instructed by the user, the seamless recording is executed. Also in the snap recording mode, management information is generated by the additional information management unit 111 in a manner similar to the normal recording mode.

After the start of the recording, when it is detected that a predetermined time elapses from the recording start on the basis of the output of the timer (not shown), the control unit 102 instructs the recording medium control unit 106 to stop the recording. The control unit 102 instructs the additional information management unit 111 to generate a play-list file and management information. The additional information management unit 111 generates the play-list file and management information in a manner similar to the normal recording mode. However, with respect to snap recording information, snap recording information indicating that the recording is the snap recording is generated.

Subsequently, processings at the time of reproduction will be described. When a switching instruction of the reproducing mode is input from the UI 103, the control unit 102 instructs the recording medium control unit 106 to detect a plurality of scenes recorded in the selected one of the two recording mediums 108 and 109. A top moving image file of each scene is reproduced and one picture which is the top of the reproduced scene is decoded by the signal processing unit 104 and stored into the memory 105. An image signal of the decoded top screen is reduced by the signal processing unit 104 to generate a representative image of each scene. An index screen constructed by representative images of a plurality of scenes is generated and displayed to the display unit 110.

The user selects a desired one of the representative images displayed on the index screen by operating the UI 103 to instruct the reproduction. When a reproducing instruction is input, the control unit 102 controls the recording medium control unit 106 so as to reproduce a plurality of moving image files of the scene corresponding to the selected representative image. The recording medium control unit 106 reproduces the moving image files of the designated scene from the recording mediums. The signal processing unit 104 decodes the reproduced moving image files, displays on the display unit 110, and outputs to the outside by the output unit 107.

On the basis of the management information reproduced from the recording mediums 108 and 109, the control unit 102 discriminates whether or not the moving image which is being reproduced is seamless-recorded. In the case of the moving image which is seamless-recorded, when an end portion of the moving image which is being reproduced approaches, the control unit 102 instructs to start the reproduction of the next moving image in such a manner that the last frame of the moving image being currently reproduced and the top frame of the moving image to be reproduced next have a predetermined frame interval therebetween. In response to the instruction from the control unit 102, the recording medium control unit 106 reads out the moving image file of the next scene and stores into the memory 105. Thus, the seamless reproduction can be performed.

If the next moving image is not seamless-recorded, the control unit 102 instructs the recording medium control unit 106 to start the read-out of the moving image data of the next scene after completion of the read-out from the recording mediums 108 and 109 from which the moving image is being reproduced. In this case, there is a case where the seamless reproduction is not performed.

Subsequently, simultaneous recording will be described. In the present embodiment, the moving image data and audio data which are input from the input unit 101 can be also simultaneously recorded into the two recording mediums 108 and 109. Also in the simultaneous recording, if the inhibition of the seamless recording is not instructed from the user, the seamless recording is automatically performed.

Figure 3B:
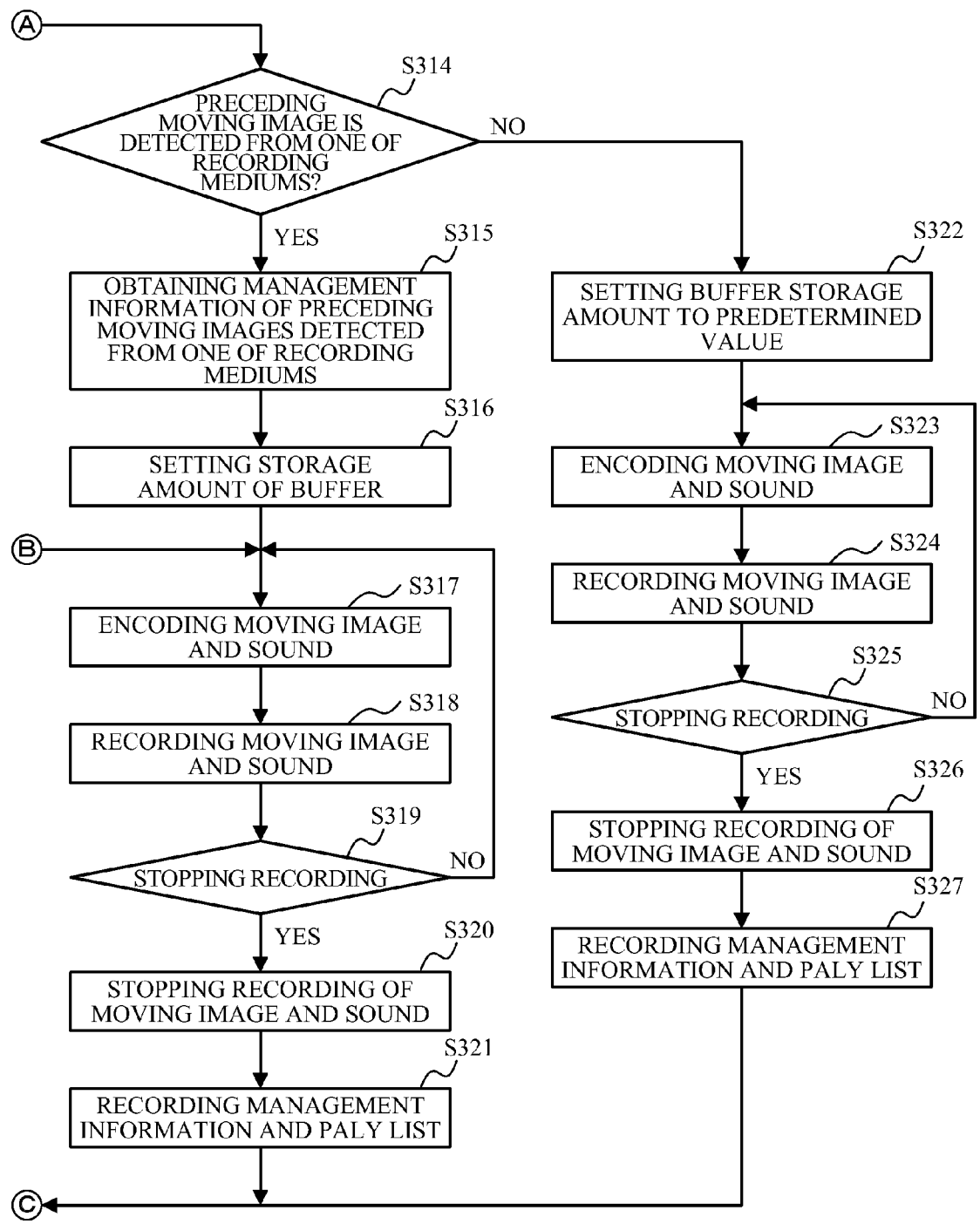
FIG. 3 is comprised of FIGS. 3A and 3B showing flowcharts for processings at the time of simultaneous recording in the first embodiment of the invention.

FIGS. 3A and 3B are flowcharts illustrating processings in the case of performing the simultaneous recording in the normal recording mode. The processings illustrated in FIGS. 3A and 3B are executed based on control of the control unit 102.

In the recording stand-by state, when the user sets the simultaneous recording by operating the UI 103, the control unit 102 designates the two recording mediums 108 and 109 as recording mediums of a recording destination. When the user inputs the recording start instruction by operating the UI 103 in this state, the control unit 102 discriminates whether or not the preceding moving image is recorded in each of the recording mediums. For example, if no moving image files are recorded or in the case of the recording medium just after it is initialized, no preceding moving images are recorded. On the basis of the play-list file read out from the recording mediums 108 and 109 in the recording stand-by state, the control unit 102 detects the preceding moving image recorded in each of the recording mediums 108 and 109 (S301).

The control unit 102 discriminates whether or not the preceding moving images is recorded in both of the recording mediums 108 and 109 (S302). If the preceding moving images are recorded in both of the recording mediums 108 and 109, the control unit 102 instructs the recording medium control unit 106 to read out the management information corresponding to the clip of the preceding moving image from each of the recording mediums. The recording medium control unit 106 reads out the management information of the designated clip and stores into the memory 105. On the basis of the seamless information stored in the management information stored in the memory 105, the control unit 102 obtains the information of the storage amount of the buffer memory at the time of recording stop of the preceding moving image in each recording medium (S303). Whether or not the seamless recording can be performed to both of the recording mediums is discriminated on the basis of the storage amount of the buffer memory (S304).

In order to perform the seamless recording to each recording medium, it is necessary that the stored data amount of the buffer memory at the time of recording stop of the preceding moving image recorded in each recording medium coincides. This is because if the stored data amount of the buffer memory at the time of recording stop of the preceding moving image recorded in each recording medium differs, the code amounts of the moving images which are recorded to the two recording mediums cannot be controlled in the same manner in accordance with the buffer model. Therefore, in the embodiment, the stored data amount of the buffer memory at the time of recording stop of the preceding moving image recorded in each recording medium is compared. When the stored data amounts coincide, it is determined that the seamless recording can be performed to both of the recording mediums. On the other hand, if the stored data amount of the buffer memory at the time of recording stop of the preceding moving image differs, it is determined that the seamless recording cannot be performed to both of the recording mediums.

If it is determined that the seamless recording can be performed to both of the recording mediums, the control unit 102 sets the stored data amount of the buffer memory at the time of recording stop of the preceding moving image in each recording medium obtained in S303 to the stored data amount of the buffer memory at the time of recording start (S306). The control unit 102 instructs the signal processing unit 104 to start the encoding of the moving image data and audio data. As mentioned above, the signal processing unit 104 sequentially encodes the input moving image data and audio data (S307). At this time, the control unit 102 adjusts the generation code amount of the moving image data on the basis of the storage amount of the buffer memory set in S306. The control unit 102 instructs the recording medium control unit 106 to record the moving image and sound. The recording medium control unit 106 reads out the moving image data and audio data from the memory 105 and records together into the recording mediums 108 and 109 (S308).

After the recording of the moving image and sound is started to the two recording mediums 108 and 109 as mentioned above, the control unit 102 discriminates whether or not the recording stop instruction is input from the UI 103 (S309). The processings of S307 and S308 are repeated until the recording stop instruction is input. If the recording stop instruction is input from the UI 103, the control unit 102 instructs the signal processing unit 104 to stop the encoding of the moving image and sound and instructs the recording medium control unit 106 to stop the recording of the moving image and sound (S310). In response to the instruction from the control unit 102, the signal processing unit 104 stops the encoding of the moving image and sound and sends the information of the storage amount of the buffer memory at the time of encoding stop to the additional information management unit 111. The recording medium control unit 106 stops the recording of the moving image and sound to the recording mediums 108 and 109.

The control unit 102 instructs the additional information management unit 111 to change the play list of each recording medium. Further, the control unit 102 instructs the additional information management unit 111 to store the information of the storage amount of the buffer memory at the time of recording stop of the moving image file recorded into each recording medium and the seamless discrimination information. The additional information management unit 111 changes the recording order of the play-list files stored in the memory 105. The additional information management unit 111 generates the information of the storage amount of the buffer memory at the time of recording stop of the recorded moving image file and the seamless discrimination information and stores into the management information stored in the memory 105. Since the seamless recording is performed to each of the two recording mediums here, the seamless discrimination information indicating that the seamless reproduction is possible is generated. The control unit 102 instructs the recording medium control unit 106 so as to record the management information and play-list file to the recording mediums. The recording medium control unit 106 reads out the management information and play-list file which are generated or updated by the additional information management unit 111 from the memory 105 and records into the recording mediums 108 and 109 (S311). The control unit 102 generates the information of the UUID as mentioned above, adds a UUID having the same value to the moving image file which was simultaneously recorded to each recording medium, and records a resultant file.

If it is determined in S304 that the stored data amount of the buffer memory at the time of recording stop of the preceding moving image differs and the seamless recording cannot be performed to both of the recording mediums, the control unit 102 selects a predetermined one of the two recording mediums 108 and 109 (S312). It is now assumed that the recording medium 108 is selected. The stored data amount of the buffer memory at the time of recording stop of the preceding moving image recorded in the selected recording medium is set to the stored data amount of the buffer memory at the time of recording start (S313).

The control unit 102 instructs the signal processing unit 104 to start the encoding of the moving image data and audio data. As mentioned above, the signal processing unit 104 sequentially encodes the input moving image data and audio data (S317). At this time, the control unit 102 adjusts the generation code amount of the moving image data on the basis of the storage amount of the buffer memory set in S313. The control unit 102 instructs the recording medium control unit 106 to record the moving image and sound. The recording medium control unit 106 reads out the moving image data and audio data from the memory 105 and records together into the recording mediums 108 and 109 (S318).

After the recording of the moving image and sound is started to the two recording mediums 108 and 109 as mentioned above, the control unit 102 discriminates whether or not the recording stop instruction is input from the UI 103 (S319). The processings of S317 and S318 are repeated until the recording stop instruction is input. If the recording stop instruction is input from the UI 103, the control unit 102 instructs the signal processing unit 104 to stop the encoding of the moving image and sound and instructs the recording medium control unit 106 to stop the recording of the moving image and sound (S320). In response to the instruction from the control unit 102, the signal processing unit 104 stops the encoding of the moving image and sound and sends the information of the storage amount of the buffer memory at the time of encoding stop to the additional information management unit 111. The recording medium control unit 106 stops recording the moving image and sound in the recording mediums 108 and 109.

The control unit 102 instructs the additional information management unit 111 to change the play list on each recording medium. Further, the control unit 102 instructs the additional information management unit 111 so as to store the information of the storage amount of the buffer memory at the time of recording stop of the moving image file recorded into each recording medium and the seamless discrimination information. The additional information management unit 111 changes the recording order of the play-list files stored in the memory 105. The additional information management unit 111 generates the information of the storage amount of the buffer memory at the time of recording stop of the recorded moving image file and the seamless discrimination information and stores into the management information stored in the memory 105. In this instance, the seamless recording is performed to one of the two recording mediums and the seamless recording is not performed to the other recording medium. Therefore, with respect to the predetermined recording medium, that is, the recording medium 108, the seamless information showing that the seamless reproduction is possible is generated. With respect to the recording medium 109, the seamless information showing that the seamless reproduction is impossible is generated. The control unit 102 instructs the recording medium control unit 106 to record the management information and the play-list file into the recording mediums. The recording medium control unit 106 reads out the management information and play-list file which are generated or updated by the additional information management unit 111 from the memory 105 and records into the recording mediums 108 and 109 (S321). The control unit 102 generates the information of the UUID as mentioned above, adds a UUID having the same value to the moving image file which is simultaneously recorded to each recording medium, and records a resultant file.

If it is determined in S302 that no preceding moving images are recorded in both of the recording mediums, whether or not the preceding moving image is recorded only in one of the recording mediums is discriminated (S314). If the preceding moving image has been recorded in one of the recording mediums and no preceding moving images are recorded in the other recording medium, the control unit 102 instructs the recording medium control unit 106 to read out the management information corresponding to the clip of the preceding moving image from one of the recording mediums. The recording medium control unit 106 reads out the management information of the designated clip and stores into the memory 105. On the basis of the seamless information stored in the management information stored in the memory 105, the control unit 102 obtains the information of the stored data amount of the buffer memory at the time of recording stop of the preceding moving image (S315). The control unit 102 sets the stored data amount of the buffer memory at the time of recording stop of the preceding moving image recorded in one of the recording mediums to the stored data amount of the buffer memory at the time of recording start (S316).

The control unit 102 instructs the signal processing unit 104 to start the encoding of the moving image data and audio data. As mentioned above, the signal processing unit 104 sequentially encodes the input moving image data and audio data (S317). At this time, the control unit 102 adjusts the generation code amount of the moving image data on the basis of the storage amount of the buffer memory set in S313. The control unit 102 instructs the recording medium control unit 106 to record the moving image and sound. The recording medium control unit 106 reads out the moving image data and audio data from the memory 105 and records together into the recording mediums 108 and 109 (S318).

After the recording of the moving image and sound is started to the two recording mediums 108 and 109 as mentioned above, the control unit 102 discriminates whether or not the recording stop instruction is input from the UI 103

(S319). The processings of S317 and S318 are repeated until the recording stop instruction is input. If the recording stop instruction is input from the UI 103, the control unit 102 instructs the signal processing unit 104 to stop the encoding of the moving image and sound and instructs the recording medium control unit 106 to stop the recording of the moving image and sound (S320). In response to the instruction from the control unit 102, the signal processing unit 104 stops the encoding of the moving image and sound and sends the information of the storage amount of the buffer memory at the time of encoding stop to the additional information management unit 111. The recording medium control unit 106 stops recording the moving image and sound to the recording mediums 108 and 109.

The control unit 102 instructs the additional information management unit 111 to change the play list on each recording medium. Further, the control unit 102 instructs the additional information management unit 111 to store the information of the storage amount of the buffer memory at the time of recording stop of the moving image file recorded into each recording medium and the seamless discrimination information. The additional information management unit 111 changes the recording order of the play-list files stored in the memory 105. The additional information management unit 111 generates the information of the storage amount of the buffer memory at the time of recording stop of the recorded moving image file and the seamless discrimination information and stores into the management information stored in the memory 105. In this instance, the seamless recording is performed to one of the two recording mediums and the seamless recording is not performed to the other recording medium. Therefore, with respect to the recording medium 108 in which the preceding moving image is recorded, the seamless information indicating that the seamless reproduction is possible is generated. With respect to the other recording medium, the seamless information indicating that the seamless reproduction is impossible is generated. The control unit 102 instructs the recording medium control unit 106 to record the management information and the play-list file into the recording mediums. The recording medium control unit 106 reads out the management information and play-list file which are formed or updated by the additional information management unit 111 from the memory 105 and records into the recording mediums 108 and 109 (S321). The control unit 102 generates the information of the UUID as mentioned above, adds the UUID having the same value to the moving image file which is simultaneously recorded to each recording medium, and records a resultant file.

If it is determined in S314 that no preceding moving images are recorded in both of the recording mediums 108 and 109, the control unit 102 sets a predetermined value as a stored data amount of the buffer memory (S322). In this instance, 0 is set as a predetermined value. The control unit 102 instructs the signal processing unit 104 to start the encoding of the moving image data and audio data. As mentioned above, the signal processing unit 104 sequentially encodes the input moving image data and audio data (S323). At this time, the control unit 102 adjusts the generation code amount of the moving image data in accordance with the buffer model. The control unit 102 instructs the recording medium control unit 106 to record the moving image and sound. The recording medium control unit 106 reads out the moving image data and audio data from the memory 105 and records together into the recording mediums 108 and 109 (S324).

After the recording of the moving image and sound is started to the two recording mediums 108 and 109 as mentioned above, the control unit 102 discriminates whether or not the recording stop instruction is input from the UI 103 (S325). The processings of S317 and S318 are repeated until the recording stop instruction is input. If the recording stop instruction is input from the UI 103, the control unit 102 instructs the signal processing unit 104 to stop the encoding of the moving image and sound and instructs the recording medium control unit 106 to stop the recording of the moving image and sound (S326). In response to the instruction from the control unit 102, the signal processing unit 104 stops the encoding of the moving image and sound and sends the information of the storage amount of the buffer memory at the time of encoding stop to the additional information management unit 111. The recording medium control unit 106 stops recording the moving image and sound in the recording mediums 108 and 109.

The control unit 102 instructs the additional information management unit 111 to change the play list on each recording medium. Further, the control unit 102 instructs the additional information management unit 111 to store the information of the storage amount of the buffer memory at the time of recording stop of the moving image file recorded into each recording medium and the seamless discrimination information. The additional information management unit 111 changes the recording order of the play-list files stored in the memory 105. The additional information management unit 111 generates the information of the storage amount of the buffer memory at the time of recording stop of the recorded moving image file and the seamless discrimination information and stores into the management information stored in the memory 105. In this instance, the seamless recording is not performed to both of the two recording mediums. Therefore, with respect to each recording medium, the seamless information indicating that the seamless reproduction of the moving image recorded at present is impossible is generated. The control unit 102 instructs the recording medium control unit 106 to record the management information and the play-list file into the recording mediums. The recording medium control unit 106 reads out the management information and play-list file which are generated or updated by the additional information management unit 111 from the memory 105 and records into the recording mediums 108 and 109 (S327). The control unit 102 generates the information of the UUID as mentioned above, adds the UUID having the same value to the moving image file which is simultaneously recorded to each recording medium, and records a resultant file.

Figure 4A:
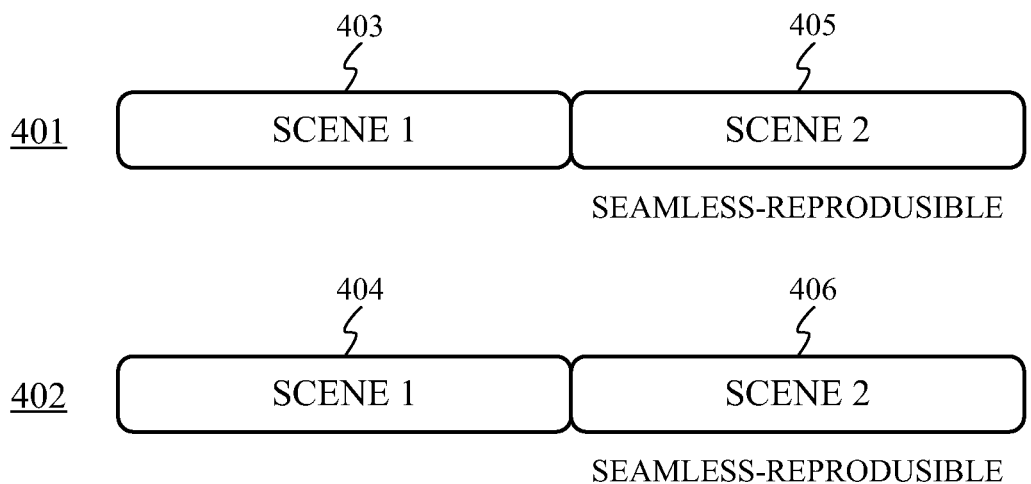
FIGS. 4A, 4B, 4C and 4D are diagrams each illustrating a moving image file and seamless discrimination information which are recorded in a simultaneous recording mode.

FIGS. 4A to 4D are diagrams each illustrating a moving image file recorded in the simultaneous recording mode. In FIGS. 4A to 4D, a moving image file 401 recorded in the recording medium 108 and a moving image file 402 recorded in the recording medium 109 are illustrated. FIG. 4A illustrates a case where the preceding moving images are recorded in both of the recording mediums and the storage amount of the buffer memory at the time of recording stop of each preceding moving image is equal. In this instance, moving image files 403 and 404 of a same scene 1 are recorded in both of the recording mediums. Moving image files 405 and 406 of a scene 2 are seamless-recorded to the respective recording mediums and the seamless discrimination information indicating that the seamless reproduction is possible is recorded thereto.

Figure 4B:
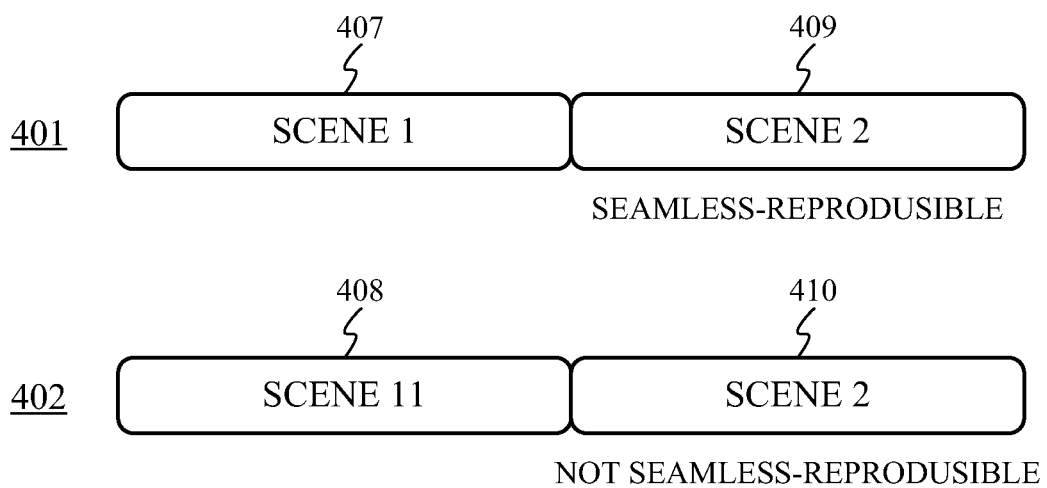

FIG. 4B illustrates a case where the preceding moving images are recorded in both of the recording mediums and the storage amount of the buffer memory at the time of recording stop of each preceding moving image differs. In this instance, a moving image file 407 of the scene 1 is recorded in the recording medium 108 and a moving image file 408 of a scene 11 is recorded in the recording medium 109. Therefore, a moving image file of the scene 2 is seamless-recorded to the recording medium 108 and the seamless discrimination information indicating that the seamless reproduction is possible is recorded thereto. On the other hand, although a moving image file 410 of the scene 2 is recorded in the recording medium 109, since the seamless recording is not performed to the scene 11, the seamless discrimination information indicating that the seamless reproduction is impossible is recorded.

Figure 4C:
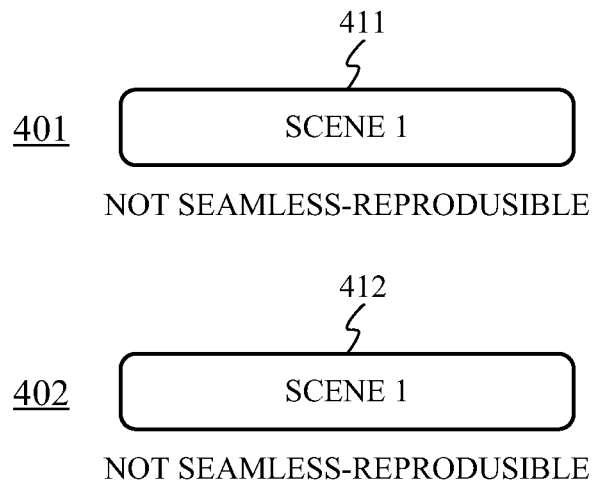

FIG. 4C illustrates a case where no preceding moving images are recorded in both of the recording mediums. In this instance, since no preceding moving images are recorded in both of the recording mediums, moving image files 411 and 412 of the scene 1 are recorded in each recording medium and the seamless discrimination information indicating that the seamless reproduction is impossible is recorded thereto.

As mentioned above, in the present embodiment, in the case of simultaneously recording the same moving image to the two recording mediums, whether or not the seamless recording is possible to each recording medium is discriminated. If the seamless recording to each recording medium is possible, on the basis of the storage amount of the buffer memory at the time of recording stop of the preceding moving image recorded in each recording medium, the code amount of the moving image to be recorded is adjusted, thereby performing the seamless recording. If the seamless recording is impossible to each recording medium, the seamless recording is performed to any one of the two recording mediums.

Therefore, when the moving image is simultaneously recorded to a plurality of recording mediums, the user can record the moving image to each recording medium so that the moving image can be reproduced successively to the just preceding scene without performing any special instruction.

If the seamless recording cannot be performed to both of the recording mediums, the seamless recording is performed to a predetermined recording medium. The predetermined recording medium which is selected at this time is previously set into the control unit 102. Thus, when the moving image is simultaneously recorded to a plurality of recording mediums, the user can record the moving image to each recording medium so that the moving image can be reproduced successively to the just preceding scene to any one of the recording mediums without performing any special instruction.

Although the present embodiment has been described with respect to a case where the moving image is simultaneously recorded to the two recording mediums, the invention can be also similarly applied even to a case where the moving image is recorded to three or more recording mediums.

Although the predetermined recording medium is selected in S312, the user may select any one of the recording mediums. In S312, one of the two recording mediums in which the storage amount of the buffer memory at the time of recording stop of the preceding moving image is smaller may be selected as a predetermined recording medium. In the case of the recording medium in which the storage amount of the buffer memory at the time of recording stop is smaller, since a larger amount of codes which are allocated to the top frame can be set at the time of recording start of the next scene, the moving image of higher picture quality can be recorded.

In the present embodiment, whether or not the seamless recording can be performed to the two recording mediums is discriminated based on the storage amount of the buffer memory at the time of recording stop of the preceding moving image in each recording medium in S304. However, besides the storage amount of the buffer memory, for example, whether or not the seamless recording can be performed to the two recording mediums can be also discriminated based on the UUID added upon recording.

That is, as mentioned above, the UUID having the same value is added to the moving image file recorded simultaneously into the two recording mediums. Thus, if the UUIDs of the preceding moving images recorded to the respective recording mediums are the same, the storage amounts of the buffer memory at the time of recording stop of those moving image files ought to be equal. Therefore, in the recording stand-by state, the UUIDs of the preceding moving images are read out and stored into the memory 105. In S302, whether or not the seamless recording can be performed to each recording medium is discriminated based on the UUIDs. If the UUIDs are equal, it is determined that the seamless recording can be performed to the two recording mediums. If the UUIDs are different, it is determined that the seamless recording cannot be performed.

It is also possible to construct in such a manner that in the simultaneous recording mode, after the recording is stopped, until a power source of a video camera is turned off or one of the recording mediums is ejected, it is automatically decided that the seamless recording can be performed to both of the recording mediums. By using such a construction, when the recording is started next, there is no need to execute the processings of S301 to S304. Further, when the recording of the moving image to each recording medium is stopped, the stored data amount of the buffer memory at the time of recording stop may be stored into the memory 105. When the recording is started next, the code amount of the moving image is adjusted based on the information of the stored data amount stored in the memory 105.

According to the foregoing embodiment, when the moving image is recorded to a plurality of recording mediums, the moving image can be recorded to each recording medium so that it can be reproduced successively to the just preceding scene.

Second Embodiment

Subsequently, the second embodiment will be described. Also in the second embodiment, a construction of the video camera 100, the normal recording mode, the snap recording mode, and the processings upon reproduction are similar to those in the first embodiment.

In the second embodiment, when the simultaneous recording is performed, on the basis of the recording mode and attributes of the preceding moving images recorded in the recording mediums 108 and 109, any one of the recording mediums is selected and the seamless recording is performed to the preceding moving image recorded in the selected recording medium.

Figure 7:
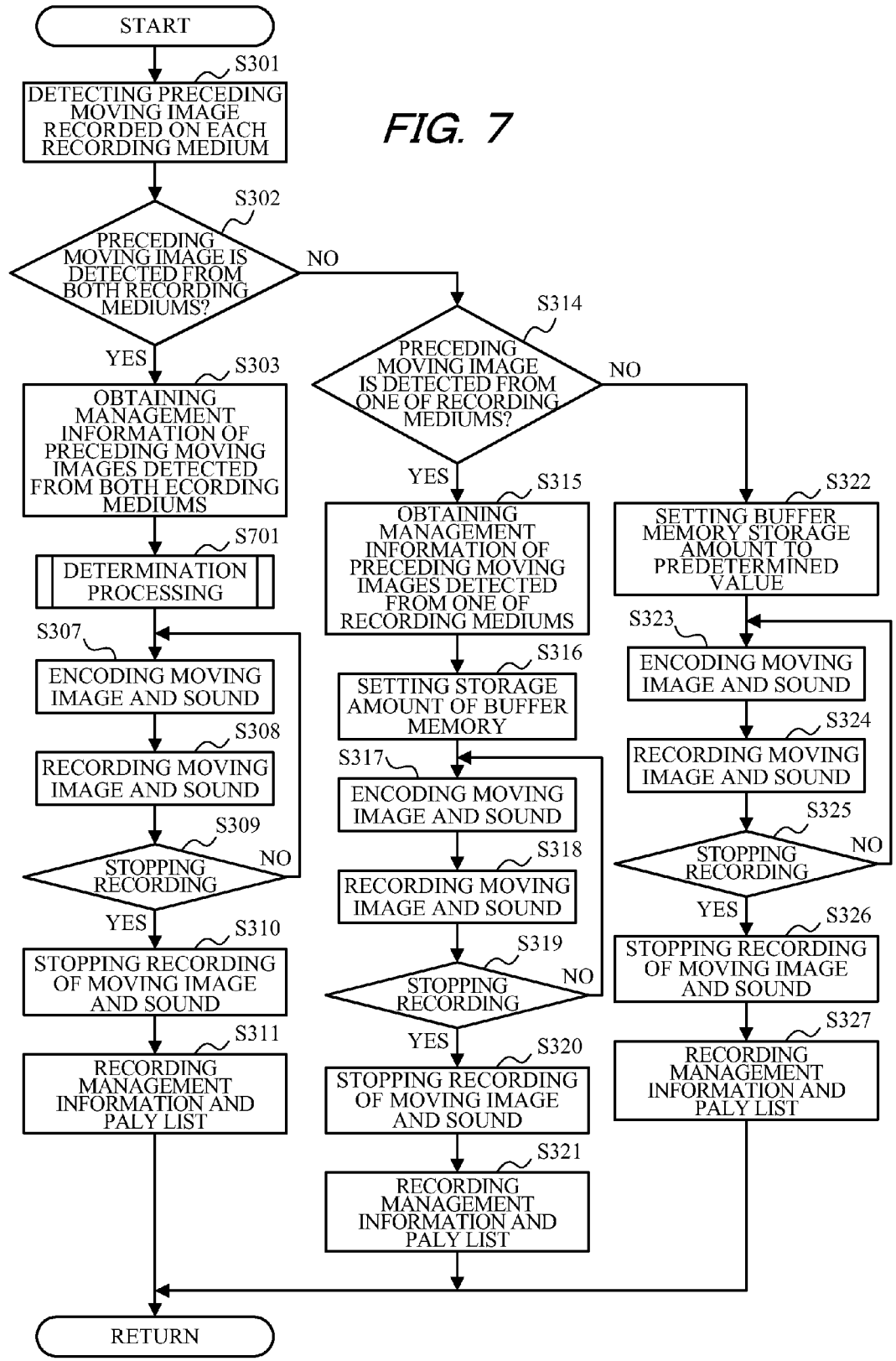
FIG. 7 is a flowchart for processings at the time of simultaneous recording in the second embodiment of the invention.

FIG. 7 is a flowchart illustrating processings in the case of performing the simultaneous recording in the second embodiment. The processings in FIG. 7 are executed by controlling each unit by the control unit 102. In FIG. 7, the processings similar to those in FIGS. 3A and 3B are designated by the same reference numerals and their detailed description is omitted.

The processings of FIG. 7 are similar to those in FIGS. 3A and 3B except the processing of S701. That is, in FIG. 7, after the management information of the clip of the preceding moving image recorded in each recording medium is obtained in S303, a discrimination processing for discriminating whether or not the seamless recording is performed to any one of the recording mediums based on the management information is executed (S701).

Figure 8B:
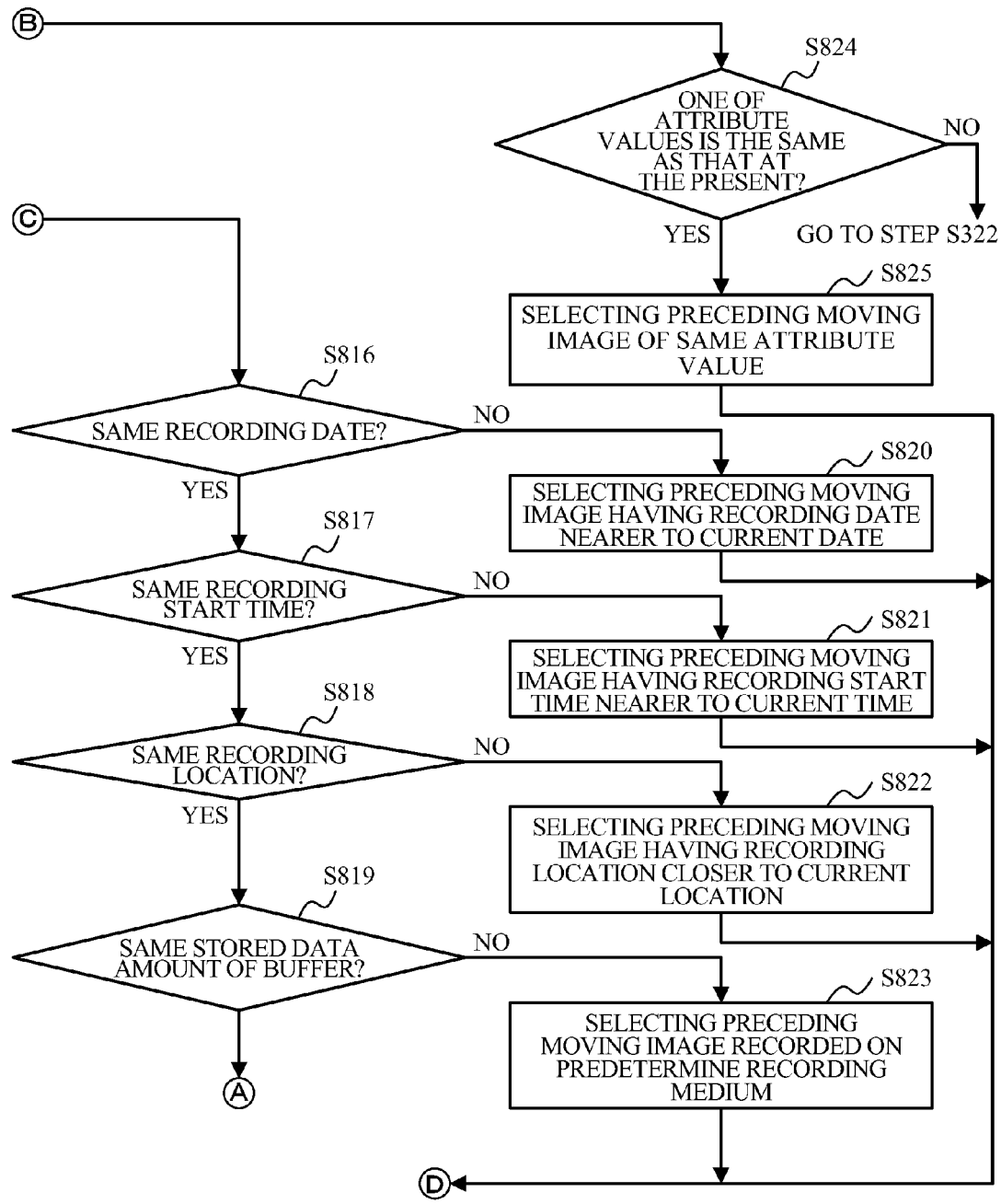
FIG. 8 is comprised of FIGS. 8A and 8B showing flowcharts for a discrimination processing included in the processings at the time of simultaneous recording in the second embodiment of the invention.

FIGS. 8A and 8B are flowcharts illustrating the discrimination processing of S701. First, the control unit 102 compares attributes of the preceding moving image recorded in each recording medium with attributes of the moving image which are currently set and discriminates whether or not each of the attributes of the preceding moving image recorded in each recording medium is the same as each attribute currently set (S801). In this instance, the control unit 102 compares the number of pixels, an aspect ratio, a frame rate, and a bit rate in the attribute information illustrated in FIG. 6 with each of the values which are currently set and discriminates whether or not all of those values coincide, respectively. If the preceding moving images recorded in both of the recording mediums coincide with the attributes which are currently set, the control unit 102 discriminates whether or not the preceding moving images recorded in the snap recording mode exist among the preceding moving images in the respective recording mediums (S802).

If the preceding moving image in one of the recording mediums is recorded in the snap recording mode, the control unit 102 discriminates whether or not the preceding moving images in both of the recording mediums are recorded in the snap recording mode (S803). If the preceding moving images in both of the recording mediums are recorded in the snap recording mode, the control unit 102 compares recording dates of the preceding moving images in both of the recording mediums and discriminates whether or not the recording dates coincide (S804). If the recording dates of the preceding moving images in the recording mediums coincide, the control unit 102 compares recording start time of the preceding moving image in each recording medium and discriminates whether or not the recording start time coincides (S805). If the recording start time of the preceding moving image in each recording medium coincides, the control unit 102 compares a recording location of the preceding moving image in each recording medium and discriminates whether or not the recording locations coincide (S806). If the recording location of the preceding moving image in each recording medium coincides, on the basis of the seamless information of the preceding moving image in each recording medium, the control unit 102 discriminates whether or not the stored data amount of the buffer memory at the time of recording stop of each preceding moving image is equal (S807). If the stored data amount of the preceding moving image in each recording medium is equal, it is determined that the respective preceding moving images are the same, and any one of the preceding moving images is selected (S808).

On the basis of the stored data amount of the buffer memory at the time of recording stop stored in the seamless information of the selected preceding moving image, the control unit 102 sets the stored data amount of the buffer memory (S809). After that, the processing routine advances to S307 and the simultaneous recording processing is continued. After that, the seamless recording is performed to each recording medium.

If only the preceding moving image of one of the recording mediums is recorded in the snap recording mode in S803, the control unit 102 selects the preceding moving image recorded in the snap recording mode (S810). If the recording date of the preceding moving image in each recording medium differs in S804, the control unit 102 selects the preceding moving image whose recording date is nearer to the current recording date (S811). If the recording start time of the preceding moving image in each recording medium differs in S805, the control unit 102 selects the preceding moving image whose recording start time is nearer to the current time (S812). If the recording location of the preceding moving image in each recording medium differs in S806, the control unit 102 selects the preceding moving image whose recording location is closer to the current location (S813). If the stored data amount of the preceding moving image in each recording medium differs in S807, the control unit 102 selects the preceding moving image of the predetermined recording medium (S814). It is assumed here that the recording medium 108 is selected.

On the basis of the stored data amount of the buffer memory at the time of recording stop stored in the seamless information of the selected preceding moving image, the control unit 102 sets the stored data amount of the buffer memory (S815). After that, the processing routine advances to S317 and the simultaneous recording processing is continued. After that, the seamless recording is performed to one of the recording mediums.

If the preceding moving images in both of the recording mediums are not recorded in the snap recording mode in S802, the recording dates of the preceding moving images in the respective recording mediums are compared and whether or not the recording dates coincide is discriminated (S816). If the recording dates of the preceding moving images in the respective recording mediums are equal, the control unit 102 compares the recording start time of the preceding moving image in each recording medium and discriminates whether or not the recording start time is equal (S817). If the recording start time of the preceding moving image in each recording medium is equal, the control unit 102 compares the recording location of the preceding moving image in each recording medium and discriminates whether or not the recording locations are the same (S818). If the recording location of the preceding moving image in each recording medium is equal, on the basis of the seamless information of the preceding moving image in each recording medium, the control unit 102 discriminates whether or not the stored data amount of the buffer memory at the time of recording stop of each preceding moving image is equal (S819). If the stored data amount of the preceding moving image in each recording medium is equal, it is determined that the respective preceding moving images are the same, and any one of the preceding moving images is selected (S808).

On the basis of the stored data amount of the buffer memory at the time of recording stop stored in the seamless information of the selected preceding moving image, the control unit 102 sets the stored data amount of the buffer memory (S809). After that, the processing routine advances to S307 and the simultaneous recording processing is continued. After that, the seamless recording is performed to each recording medium.

If the recording dates of the preceding moving images in the respective recording mediums are different in S816, the control unit 102 selects the preceding moving image whose recording date is nearer to the current recording date (S820). If the recording start time of the preceding moving image in each recording medium differs in S817, the control unit 102 selects the preceding moving image whose recording start time is nearer to the current time (S821). If the recording location of the preceding moving image in each recording medium differs in S818, the control unit 102 selects the preceding moving image whose recording location is closer to the current location (S822). If the stored data amount of the preceding moving image in each recording medium differs in S819, the control unit 102 selects the preceding moving image of the predetermined recording medium (S823). It is assumed here that the recording medium 108 is selected.

On the basis of the stored data amount of the buffer memory at the time of recording stop stored in the seamless information of the selected preceding moving image, the control unit 102 sets the stored data amount of the buffer memory (S815). After that, the processing routine advances to S317 and the simultaneous recording processing is continued. After that, the seamless recording is performed to each recording medium.

If the attribute values of at least one of the preceding moving images in the recording mediums differ from the current attribute values in S801, the control unit 102 discriminates whether or not only the attributes of at least one of the preceding moving images are the same as the current attribute values (S824). If the attribute values of the preceding moving image of at least one of the recording mediums are the same as the current attribute values, the control unit 102 selects the preceding moving image of the same attribute values as the current attribute values (S825). If the attribute values of the preceding moving images recorded in each recording medium differ from the current attribute values, the processing routine advances to S322. After that, the seamless recording is not performed.

Figure 4D:
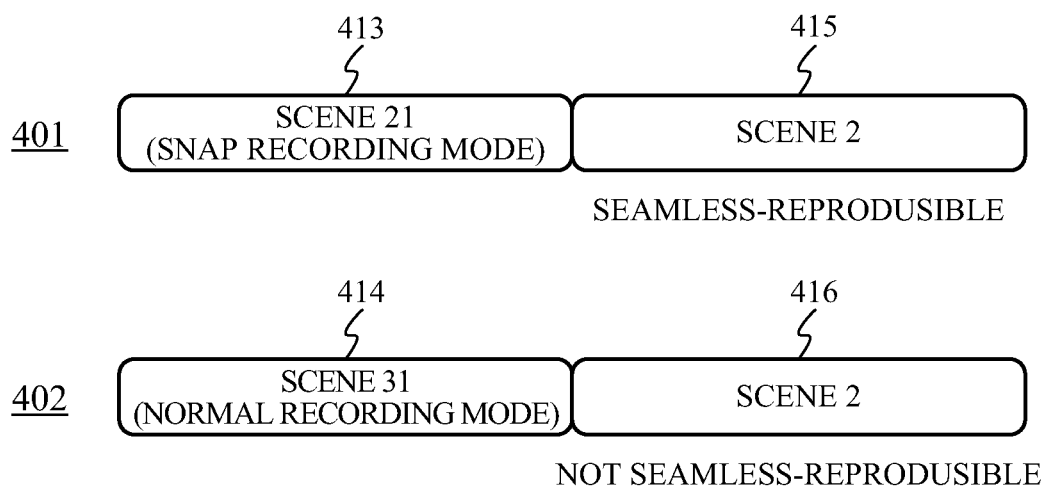

FIG. 4D illustrates a state in the case where the preceding moving images are recorded in both of the recording mediums and the recording modes of the recording mediums differ. A moving image file 413 of a scene 21 recorded in the snap recording mode is recorded in the recording medium 108, and a moving image file 414 of a scene 31 recorded in the normal recording mode is recorded in the recording medium 109. Therefore, in the present embodiment, the moving image file 413 serving as a preceding moving image recorded in the snap recording mode is selected. A moving image file 415 of the scene 2 is seamless-recorded for the moving image file 413 and the seamless discrimination information indicating that the seamless reproduction is possible is recorded. On the other hand, although a moving image file 416 of the scene 2 is recorded to the recording medium 109, since the seamless recording is not performed to the scene 31, the seamless discrimination information indicating that the seamless reproduction is impossible is recorded.

As mentioned above, in the present embodiment, in the case of simultaneously recording the same moving image to the two recording mediums, the recording medium to which the seamless recording is performed is selected on the basis of the attributes of the preceding moving image recorded in each recording medium. In the present embodiment, if one of the preceding moving images is recorded in the snap recording mode and the other is recorded in the normal recording mode, the seamless recording is performed to the preceding moving image recorded in the snap recording mode. A reproduction time of the moving image of one clip recorded in the snap recording mode is short. Therefore, when a plurality of clips recorded in the snap recording mode are reproduced, if the seamless recording is not performed, each time the moving image is reproduced for 4 seconds, the reproduced image is stopped, so that it is displeasing.

Therefore, in the present embodiment, if one of the preceding moving images is recorded in the snap recording mode and the other is recorded in the normal recording mode, the seamless recording is performed to the preceding moving image recorded in the snap recording mode. Consequently, when the simultaneous recording is performed in the snap recording mode, the seamless recording is performed to the preceding moving image which is snap-recorded and, upon reproduction, the reproduced image is not stopped at a boundary of the clips.

In the second embodiment, before whether or not the preceding moving images are the same is discriminated in S807, whether or not the preceding moving image is snap-recorded is discriminated. The preceding moving image recorded in the snap recording mode is selected and the seamless recording is performed.

Besides the foregoing construction, the predetermined recording medium is not selected in S312 in the first embodiment, but it is possible to construct in such a manner that whether or not the preceding moving image recorded in the snap recording mode exists is discriminated and, if the preceding moving image recorded in the snap recording mode exists, such a preceding moving image is selected.

If the current recording mode is not the snap recording mode, the processings of S802 to S814 are omitted and the preceding moving image in which the seamless recording is performed may be selected in accordance with an attribute value other than that of the snap recording mode.

The objects of the invention are also accomplished by a method whereby a storage medium in which a program code of software for realizing the functions of the embodiments mentioned above has been recorded is supplied to a system or an apparatus. That is, naturally, the objects of the invention are also accomplished by a method whereby a computer (or a CPU or MPU) of the system or apparatus reads out and executes the program code stored in the storage medium.

In such a case, the program code itself read out of the storage medium realizes the functions of the embodiments mentioned above. The program code itself and the storage medium in which the program code has been stored construct the invention.

As a storage medium for supplying the program code, for example, a flexible disk, a hard disk, an optical disk, a magnetooptic disk, a CD-ROM, a CD-R, a magnetic tape, a non-volatile memory card, a ROM, or the like can be used.

The functions of the embodiments mentioned above are also realized by a method whereby on the basis of instructions of the program code read out by a computer, an OS (basic system or operating system) or the like which is operating on the computer executes a part or all of actual processings. Naturally, such a case is also incorporated in the invention.

Further, in the case where the program code read out from the storage medium is written into a memory provided for a function expanding board inserted in the computer or a function expanding unit connected to the computer and processings are executed based on the instructions of the written program code, such processings are also incorporated in the invention. That is, naturally, a case where a CPU or the like provided for the function expanding board or function expanding unit executes a part or all of the actual processings on the basis of the instructions of the program code, thereby realizing the functions of the embodiments mentioned above is also incorporated in the invention.

The foregoing embodiments merely show the specific examples when embodying the invention and a technical scope of the invention must not be limitedly interpreted by them. That is, the invention can be embodied in various forms without departing from its technical idea or its main features.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-288681 filed on Dec. 24, 2010, which is hereby incorporated by reference herein in its entirety.

What is claimed is:

1. A recording apparatus comprising:
   an encoding unit configured to encode moving image data;
   a recording unit configured to record the moving image data encoded by the encoding unit into a first recording medium and a second recording medium;

a generation unit configured to, in the case where the moving image data is recorded into the recording mediums, generate seamless discrimination information for discriminating whether or not the moving image data is reproducible successively to preceding moving image data which is to be reproduced precedingly thereto; and a control unit configured to adjust a code amount of the moving image data which is encoded by the encoding unit, on the basis of a code amount of the preceding moving image data recorded into one of the first recording medium and the second recording medium in accordance with a simultaneous recording instruction to simultaneously record the moving image data encoded by the encoding unit into the first recording medium and the second recording medium and to allow the moving image data whose code amount is adjusted, and the seamless discrimination information to be recorded into the first recording medium and the second recording medium by the recording unit.

2. An apparatus according to claim 1, wherein the control unit controls the recording unit so as to record the moving image data and additional information thereof into the first and second recording mediums and generates the seamless discrimination information on the basis of the additional information of the preceding moving image data.

3. An apparatus according to claim 1, wherein in the case where the preceding moving image data recorded in the first recording medium and the preceding moving image data recorded in the second recording medium are the same, the control unit controls the generation unit so as to generate the seamless discrimination information indicating that the moving image data is reproducible successively and controls the recording unit so as to record the seamless discrimination information indicating that the moving image data is reproducible successively, into the first recording medium and the second recording medium.

4. An apparatus according to claim 1, wherein in the case where the preceding moving image data recorded in the first recording medium and the preceding moving image data recorded in the second recording medium are different, the control unit controls the generation unit so as to generate the seamless discrimination information indicating that the moving image data is reproducible successively and the seamless discrimination information indicating that the moving image data is not reproducible successively and controls the recording unit so as to record the seamless discrimination information indicating that the moving image data is reproducible successively into one of the first recording medium and the second recording medium and to record the seamless discrimination information indicating that the moving image data is not reproducible successively, into the other of the first recording medium and the second recording medium.

5. An apparatus according to claim 4, wherein the recording unit records identification information for identifying the moving image data into the recording mediums and, on the basis of the identification information of the preceding moving image data recorded in the first recording medium and the identification information of the preceding moving image data recorded in the second recording medium, the control unit discriminates whether or not the preceding moving image data recorded in the first recording medium and the preceding moving image data recorded in the second recording medium are the same.

6. An apparatus according to claim 1, wherein in the case where no preceding moving image data is recorded in both of the first recording medium and the second recording medium, the control unit controls the generation unit so as to generate the seamless discrimination information indicating that the moving image data is not reproducible successively and controls the recording unit so as to record the seamless discrimination information indicating that the moving image data is not reproducible successively, into the first recording medium and the second recording medium.

7. An apparatus according to claim 6, wherein on the basis of a play list recorded in the first recording medium and a play list recorded in the second recording medium, the control unit discriminates whether or not no preceding moving image data is recorded in both of the first recording medium and the second recording medium, the playlist indicating a reproduction order of the moving image data recorded in the recording medium.

8. An apparatus according to claim 7, wherein the control unit adjusts the code amount of the moving image data in accordance with a predetermined buffer model, the generation unit generates information about a stored data amount of a buffer at a time of recording stop of the moving image data, prescribed in the buffer model, and the recording unit records the information about the stored data amount corresponding to each of a plurality of moving image data recorded in the recording medium into the recording medium.

9. An apparatus according to claim 2, wherein the additional information includes identification information for identifying the moving image data and management information of the moving image data, the management information includes the seamless information of the moving image data, information about a code amount of the moving image data, and attribute information of the moving image data, and wherein the control unit controls the recording unit so as to record the additional information into the recording medium.

10. An apparatus according to claim 9, wherein in the case where the code amount obtained by the information about the code amount of preceding moving image data recorded in the first recording medium and the code amount obtained by the information about the code amount of preceding moving image data recorded in the second recording medium are the same, on the basis of the information about the code amount of the preceding moving image data recorded in one of the first recording medium and the second recording medium, the control unit adjusts the code amount of the moving image data, controls the generation unit so as to generate the seamless discrimination information indicating that the moving image data is reproducible successively, and controls the recording unit so as to record the seamless discrimination information indicating that the moving image data is reproducible successively, into the first recording medium and the second recording medium.

11. An apparatus according to claim 9, wherein in the case where the code amount obtained by the information about the code amount of preceding moving image data recorded in the first recording medium and the code amount obtained by the information about the code amount of preceding moving image data recorded in the second recording medium are different, on the basis of the information about the code amount of the preceding moving image data recorded in a predetermined one of the first recording medium and the second recording medium, the control unit adjusts the code amount of the moving image data, controls the generation unit so as to generate the seamless discrimination information indicating that the moving image data is reproducible successively and the seamless discrimination information indicating that the moving image data is not reproducible successively, and controls the recording unit so as to record the seamless discrimination information indicating that the moving image data is reproducible successively, into the predetermined recording medium and to record the seamless discrimination information indicating that the moving image data is not reproducible successively, into the recording medium other than the predetermined recording medium.

12. An apparatus according to claim 9, wherein on the basis of attribute information of each of the preceding moving image data recorded in the first recording medium and the second recording medium, the control unit selects one of the preceding moving image data recorded in the first recording medium and the second recording medium, and in response to the simultaneous recording instruction, on the basis of the information about the code amount of the selected preceding moving image data, the control unit adjusts the code amount of the moving image data which is encoded by the encoding unit.

13. An apparatus according to claim 9, wherein the apparatus has a normal recording mode in which the recording of the moving image data by the recording unit is started in response to a recording start instruction by the user and the recording of the moving image data is stopped in response to a recording stop instruction by the user, and a snap recording mode in which the recording of the moving image data is started in response to the recording start instruction and the recording of the moving image data is stopped in accordance with a predetermined time period elapsing from the start of recording without the recording stop instruction by the user, and wherein the attribute information includes information for discriminating whether or not the moving image data is the data recorded in the snap recording mode.

14. An apparatus according to claim 13, wherein if it is discriminated on the basis of the attribute information that one of the preceding moving image data recorded in the first recording medium and the second recording medium is recorded in the normal recording mode and the other is recorded in the snap recording mode, the control unit adjusts the code amount of the moving image data on the basis of a code amount of the preceding moving image data recorded in the snap recording mode, controls the generation unit so as to generate the seamless discrimination information indicating that the moving image data is reproducible successively and the seamless discrimination information indicating that the moving image data is not reproducible successively, and controls the recording unit so as to record the seamless discrimination information indicating that the moving image data is reproducible successively into the recording medium in which the one of the preceding moving image data is recorded and to record the seamless discrimination information indicating that the moving image data is not reproducible successively into the recording medium in which the other of the preceding moving image data is recorded.

15. A recording method of encoding input moving image data and recording the encoded moving image data into at least a first recording medium and a second recording medium, comprising:

in the case where the moving image data is recorded into the recording mediums, generating seamless discrimination information for discriminating whether or not the moving image data is reproducible successively to preceding moving image data which is reproduced precedingly thereto;

adjusting a code amount of the moving image data which is encoded, on the basis of a code amount of the preceding moving image data recorded into one of the first recording medium and the second recording medium in accordance with a simultaneous recording instruction to simultaneously record the encoded moving image data into the first recording medium and the second recording medium; and recording the moving image data whose code amount is adjusted, and the seamless discrimination information into the first recording medium and the second recording medium.

16. A non-transitory computer-readable storage medium storing a computer program for causing a computer to function, in a recording method performed in a recording apparatus comprising an encoding unit configured to encode moving image data and a recording unit configured to record the moving image data encoded by the encoding unit into a first recording medium and a second recording medium, as a generation unit configured to, in the case where the moving image data is recorded into the recording mediums, generate seamless discrimination information for discriminating whether or not the moving image data is reproducible successively to preceding moving image data which is to be reproduced precedingly thereto and as a control unit configured to adjust a code amount of the moving image data which is encoded by the encoding unit, on the basis of a code amount of the preceding moving image data recorded into one of the first recording medium and the second recording medium in accordance with a simultaneous recording instruction to simultaneously record the moving image data encoded by the encoding unit into the first recording medium and the second recording medium and to allow the moving image data whose code amount is adjusted, and the seamless discrimination information to be recorded into the first recording medium and the second recording medium by the recording unit.

* * * * *